Figure 10:
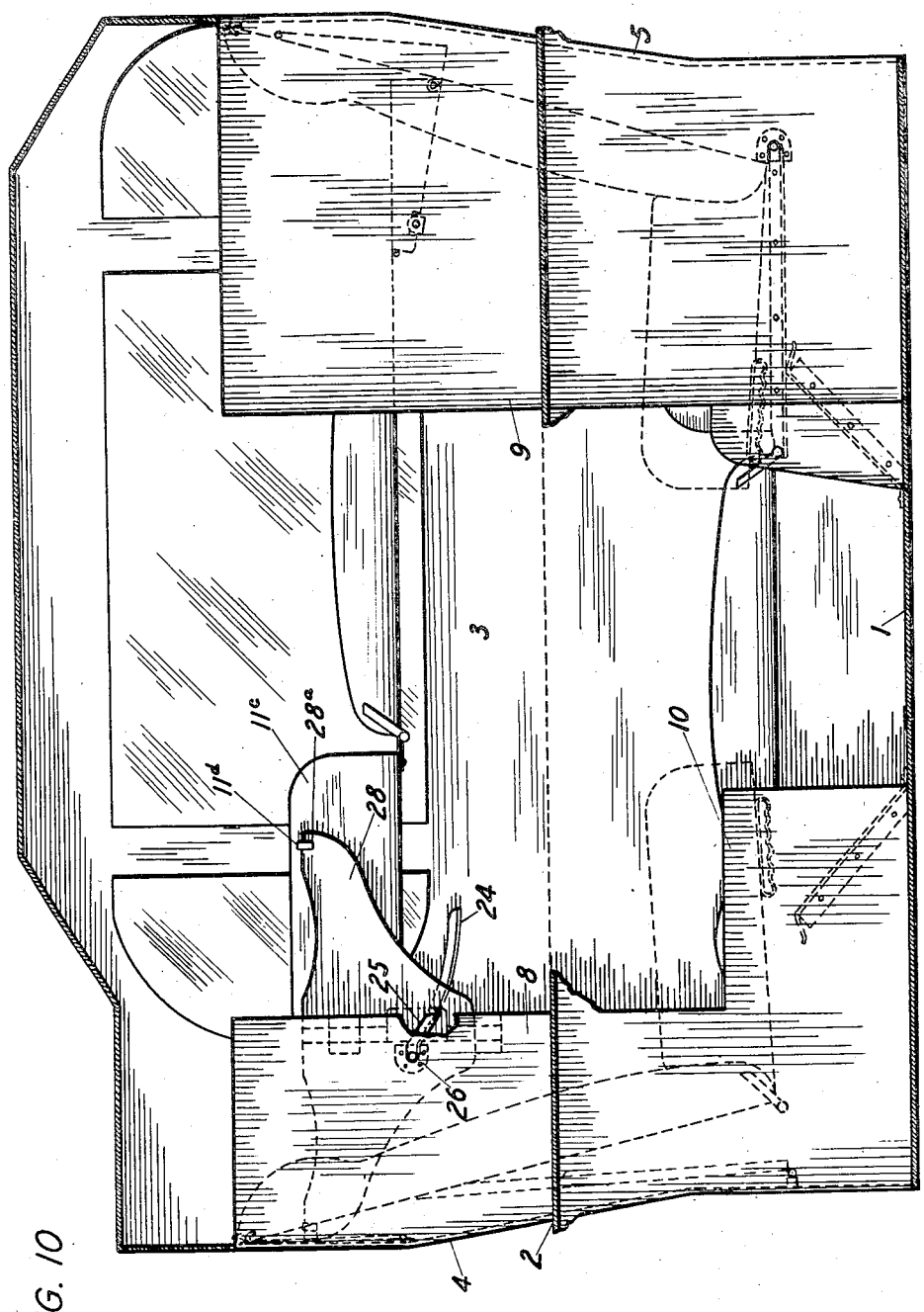

Oct. 9, 1934.    D. E. AUSTIN    1,976,320
SEAT AND BERTH CONSTRUCTION
Original Filed Nov. 23, 1929    5 Sheets-Sheet 1
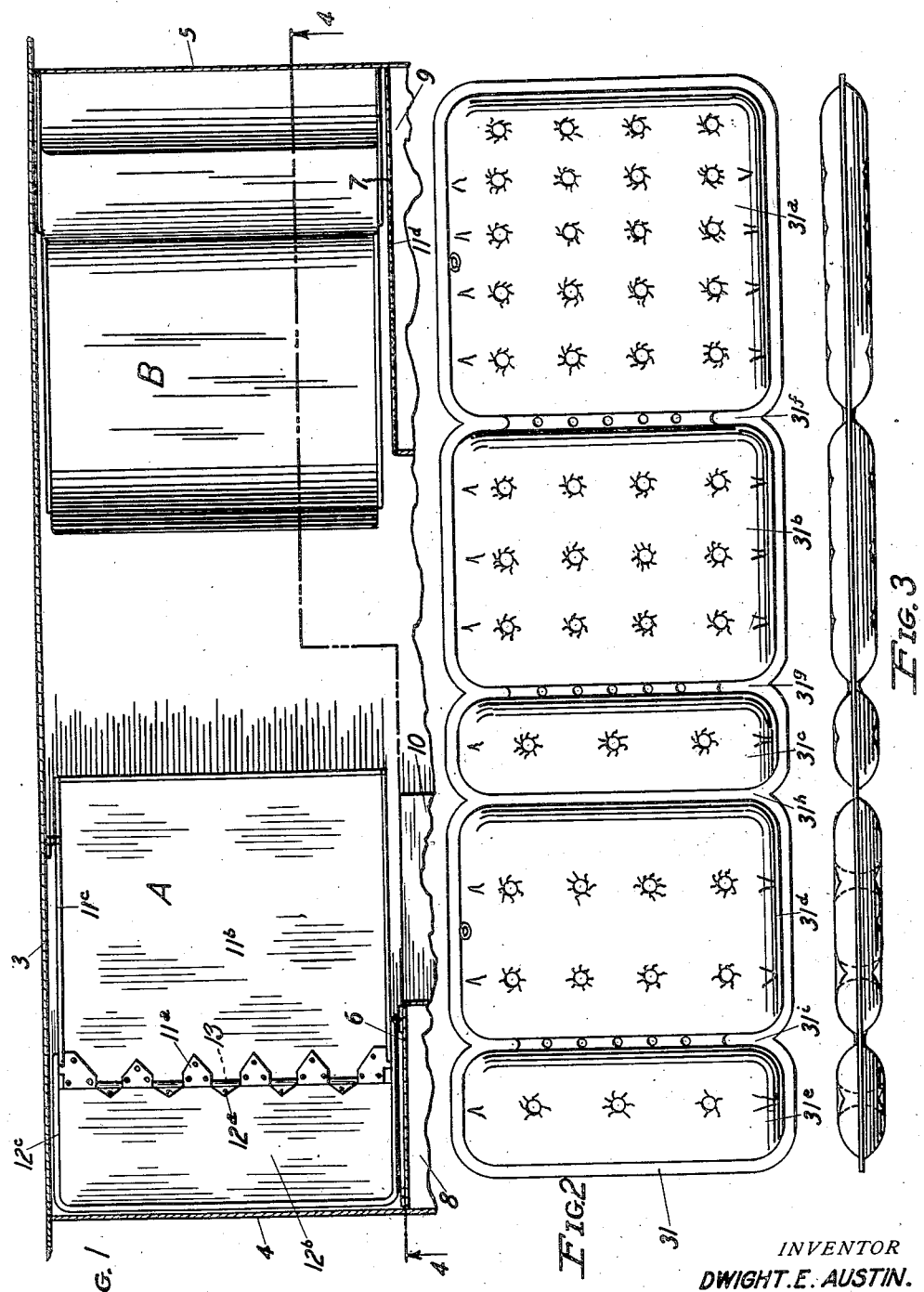
INVENTOR
DWIGHT. E. AUSTIN.
BY
A. B. Bowman
ATTORNEY

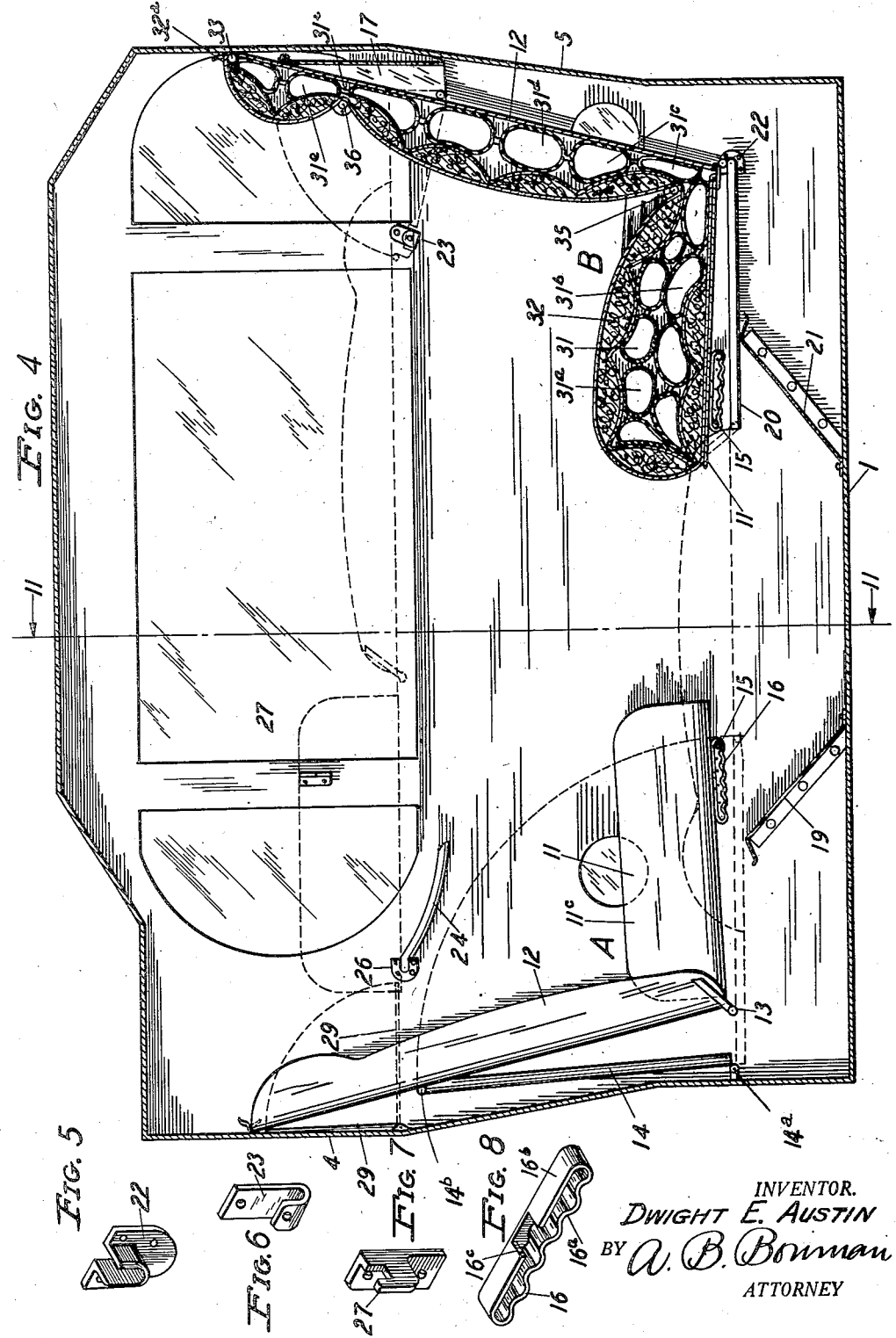

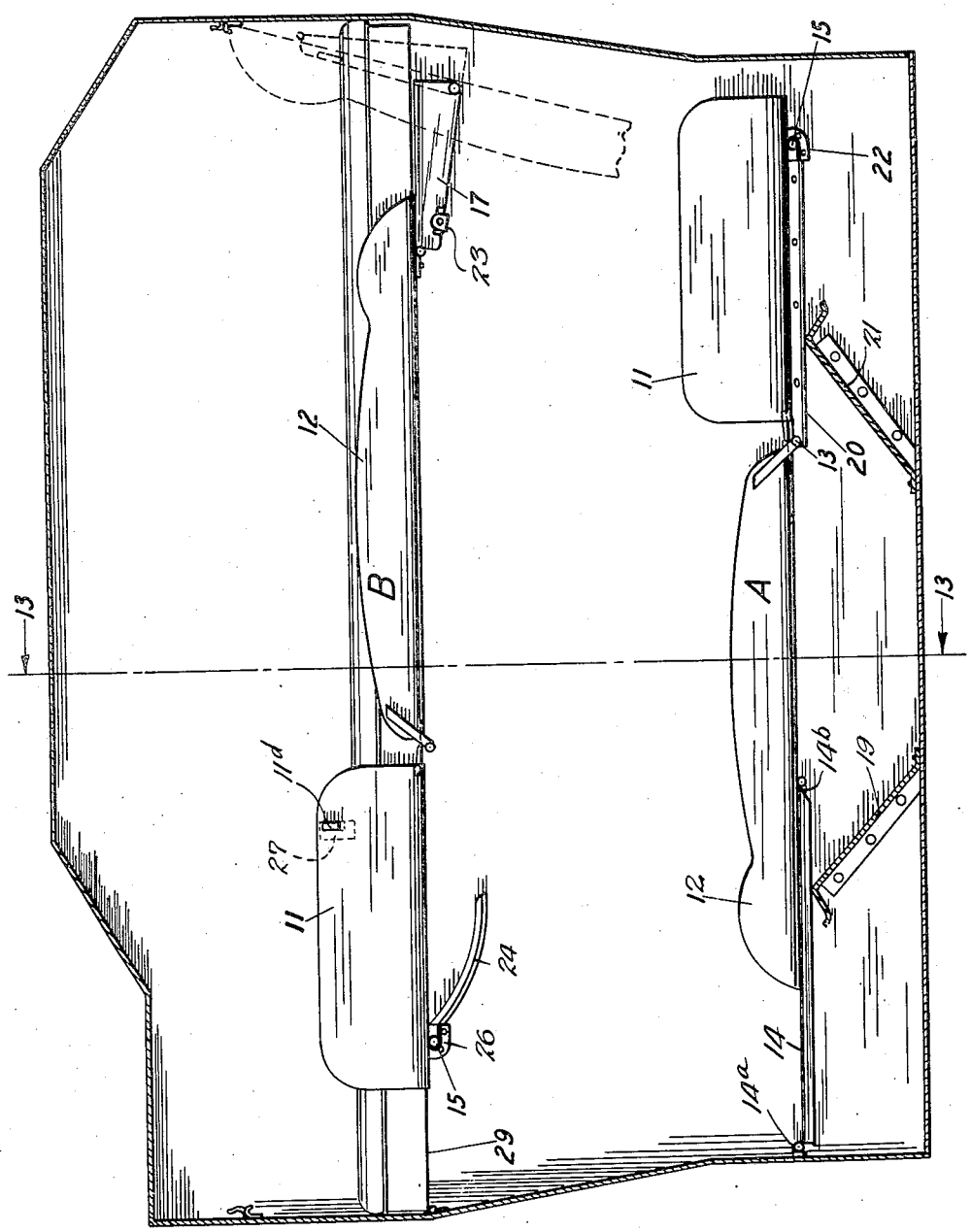

Oct. 9, 1934.  D. E. AUSTIN  1,976,320
SEAT AND BERTH CONSTRUCTION
Original Filed Nov. 23, 1929  5 Sheets-Sheet 5
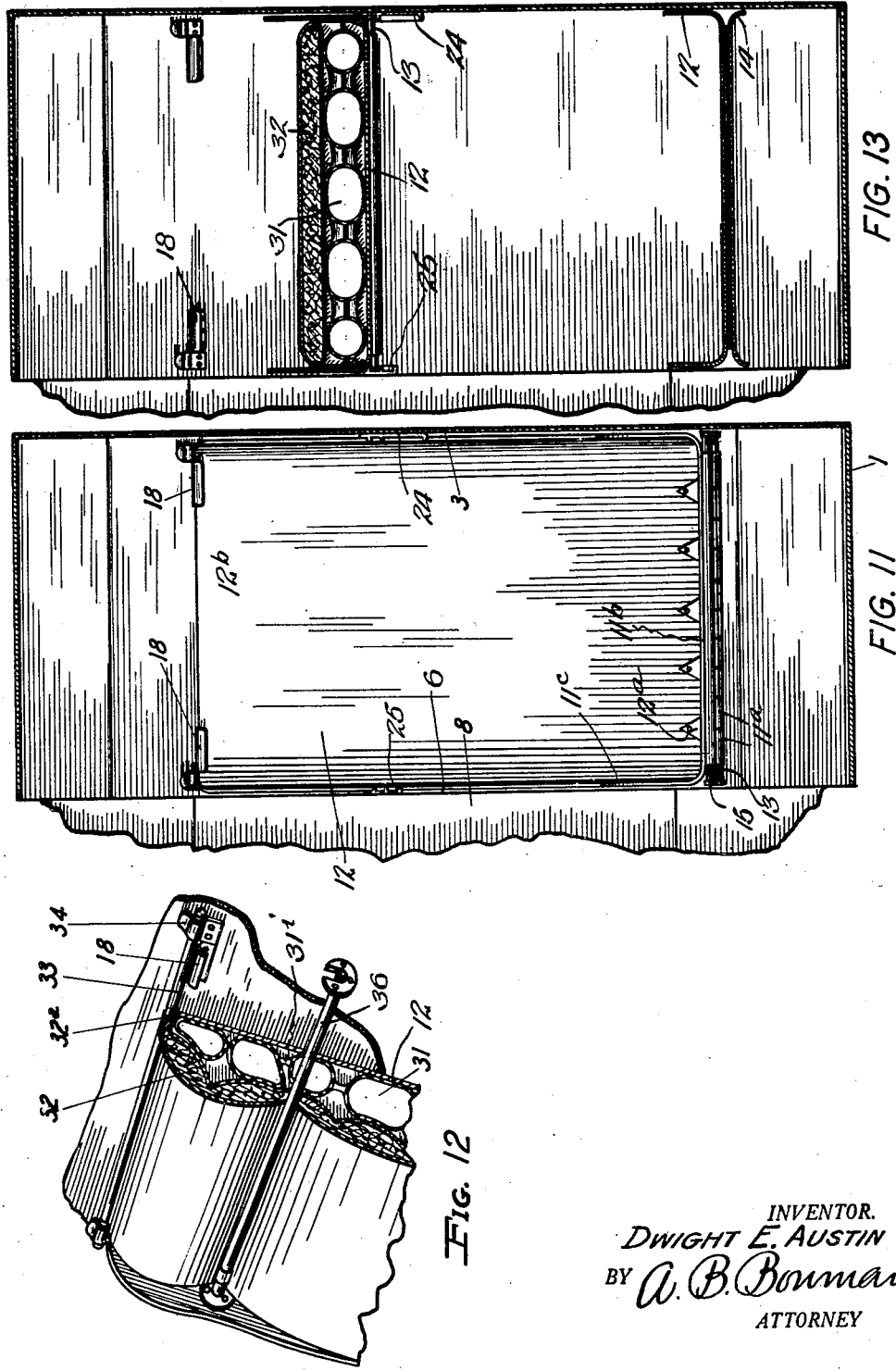
INVENTOR.
DWIGHT E. AUSTIN
BY A. B. Bowman
ATTORNEY Patented Oct. 9, 1934

1,976,320

UNITED STATES PATENT OFFICE 1,976,320

SEAT AND BERTH CONSTRUCTION

Dwight E. Austin, Pontiac, Mich., assignor to General Motors Truck Corporation, Pontiac, Mich., a corporation of Delaware Application November 23, 1929, Serial No. 409,271
Renewed July 30, 1934

6 Claims. (Cl. 155—6)

My present invention relates to seat and berth construction, and more particularly to seat and berth construction for passenger vehicles.

The objects of this invention are: first, to provide a novel seat structure which will form a comfortable seat and which can be easily and quickly converted into a berth of convenient size; second, to provide a pair of such seats in a compartment of a vehicle in which one seat may be converted into a lower berth and the other into an upper berth; third, to provide such convertible seats in the compartment of a vehicle in which the seats are in opposed relation for economy of space and in which each is rigidly supported in the compartment when used either as a seat or a berth; fourth, to provide novel means in connection with the seat members for forming a berth longer than is allowable by the use of seats and back members of ordinary size; fifth, to provide novel means for hingedly supporting the back portions of the seats either in back supporting positions or in horizontal positions rigidly against the walls of the compartment in which the seat is located, said means also forming an extension for the back portion of the seat when the back portion is shifted to a horizontal position to be used as a part of the berth; sixth, to provide a seat in which the seat and back portions are hingedly connected together and pivotally mounted from the back portion, thus permitting the seat members to be readily shifted as a unit from the seat position to the berth position, or from the latter to the former; seventh, to provide a seat of this class in which the seat portion may be easily shifted forwardly or backwardly, while the occupant is sitting in the seat, for changing the position of the seat and also the inclination of the back portion with respect to the seat portion; eighth, to provide a novel convertible seat and berth having a unitary cushion for the seat and back portions of the seat, said cushion serving as a mattress for the berth when the seat is so converted; ninth, to provide novel means for holding the cushion in position to the seat members for forming convenient cushions therefor and for readily releasing the same so that the seat members may be extended and converted into a berth and so that the cushion may be also extended to form a mattress therefor; tenth, to provide very light, durable, and very resilient cushions for seats of this class in which the same consist of pneumatic cushions covered by suitable pads for protecting the pneumatic cushions and for forming a uniform and soft covering therefor, particularly when the pneumatic cushions are tufted; eleventh, to provide pneumatic cushions for seats of this class in which the portions for the seats are provided with greater air pressure than those for the backs; twelfth, to provide cushions for the seat and back portions of the seat in which the cushions may be extended for forming a mattress when the seat is converted into a berth, said cushion being of such length that a portion thereof may be folded double for the seat portion of the seat forming a very soft and resilient seat portion; and, thirteenth, to provide such seat and such convertible seat and berth construction which is particularly simple and economical of construction, durable, comfortable, convenient, particularly light of construction for vehicles, one which is readily convertible, one for which spare cushions and pads may be readily carried in the vehicle, one in which the resiliency of the seat may be readily varied, and one which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a plan view of a vehicle passenger compartment in which are placed a pair of seats of my new construction in opposed relation; Fig. 2 is a top view of one form of pneumatic cushion incorporated in my seat and berth construction as the cushion appears when used as a mattress; Fig. 3 is an edge view thereof; Fig. 4 is a sectional elevational view of the compartment showing the seats arranged therein and showing by dotted lines the seats converted into berths, the view being taken at 4—4 of Fig. 1; Figs. 5, 6, 7 and 8 are perspective views of fittings mounted on the side walls of the compartment for holding the seat members in their different shifted positions as berths and as seats; Fig. 9 is a sectional elevational view similar to that shown in Fig. 4 but showing the seats converted into berths; Fig. 10 is a similar view thereof but showing the walls of the compartment at the sides of the seats and berths toward the middle portion of the vehicle and showing means for supporting the seats, when converted into berths, on such walls, the seat members being shown in their seating positions by dotted lines; Fig. 11 is a sectional elevational view of the compartment and seats taken at 11—11 of Fig. 4; Fig. 12 is a fragmentary perspective view of the back and head portion of the seat made up and showing its relation to one of the end walls against which it is positioned; and, Fig. 13 is a sectional elevational view of the compartment with the seats converted into berths, the view being taken at 13—13 of Fig. 9.

Like characters of reference refer to similar parts and portions throughout the views of the drawings.

The compartment, shown in the drawings, in which my seat and berth construction is incorporated, may be any suitable passenger compartment in any of the common passenger carrying vehicles now in use, such as railway coaches, automobile stages, boats, aircraft, and the like. The compartment shown in the drawings is located with its floor 1 below the aisle 2 of the vehicle, and is bounded at its outer side, or the side opposite the aisle, by an outer wall 3, at its ends by end walls 4 and 5, and between the seats and the aisle by walls 6 and 7 which may form the inner walls of storage compartments 8 and 9, shown best in Figs. 1, 10 and 11. In the space between the seats and the aisle may be a step 10 to permit ready access from the aisle to the passenger compartment, the compartment below the step 10 forming also storage space and the inner wall thereof adjacent the seats being preferably an extension of the wall 6, as shown in Fig. 1. It will be noted, however, that the incorporation of my seat and berth construction is not limited to the specific passenger compartment herein shown and described.

In the passenger compartment I have shown two seats which are arranged in opposed relation and face each other and which have a common foot space. These seats, designated A and B, are positioned in the recesses between the outside wall 3 and the inner walls 6 and 7 and against the end walls 4 and 5.

Each of the seats consists preferably of a seat portion or member 11 and a back portion or member 12, the latter of which is pivotally connected at its lower end to the inner or rear edge of the former by hinge members 11a and 12a connected by a hinge rod 13, shown best in Figs. 1 and 11. Both the seat and back members 11 and 12 are made of relatively light gauge sheet metal made in the form of wide channels or troughs, that is, the same are provided with bottom portions 11b and 12b and side flanges 11c and 12c, respectively, at the lateral edges of the bottom portions of each.

The back portion or member 12 of the seat A is supported by a wide plate 14 which is hinged at one edge 14a on and near the lower portion of the inner side of the end wall 4 and the opposite edge 14b of which is hinged to the back side of the back member 12 intermediate the normally upper and lower ends thereof, as shown in Figs. 4 and 9. To the underside of the seat members 11 of each seat, and near the forward edges thereof, are secured transverse supporting rods 15, one for each seat, as shown in Figs. 4, 9 and 11. The end of each rod 15 extends into a fitting 16 secured to the adjacent sides of the outer wall 3 and the inner walls 6 and 7. These fittings are adapted to support the seat members of each seat in various sitting positions and are substantially in the form of channel members which are provided with superimposed flanges 16a and 16b extending outwardly from the walls. The lower flange 16a of each member is provided with a multiplicity of transverse corrugations or notches into which the ends of the rod 15 extend. Intermediate the ends of the upper flange 16b of each fitting 16 is an opening 16c through which the ends of the rod 15 may be inserted for placing such ends in the several notches, or corrugations, or through which the ends of the rod may be removed when desiring to convert the seat into a berth. The notches are so arranged that a person sitting in the seat may with very slight effort force himself forwardly or backwardly and permit the ends of the rod to be shifted forwardly or backwardly into other notches or corrugations so that while sitting in the seat the occupant may shift the seat portion forwardly or backwardly and correspondingly incline the back of the seat.

The back member of the seat B is pivotally supported near its upper portion similar to the back member of the seat A, but the supporting member in this instance consists of a shorter hinge member 17 which is pivotally mounted near its normally lower portion on the opposite side walls 3 and 7 of the compartment and which is pivotally mounted at its normally upper edge at the back side and near the upper end of the back member, as shown best in Figs. 4 and 9.

When the seats are in their seating positions, as shown in Figs. 4, 11 and 12, the upper ends of the back members 12 are held against the inner sides of the end walls 4 and 5 by clip members 18 which are secured to the end walls and are bent downwardly at their upper portions. The upper edges of the back members are inserted below or under the retaining portions of the clips 18 before the rods 15 are inserted into the fittings 16. Thus the seats are permitted to be shifted backwardly and forwardly while being pivotally supported on the hinge members 14 and 17 and yet retained at the upper ends of the backs against the end walls of the compartments.

Due to the peculiar mounting of the seats, as described, the same may be readily released from the fittings 16 and extended toward the opposite ends of the compartment and in alignment with the back portions of their respective seats for converting the seats into berths, as shown by dotted lines in Fig. 4 and by solid lines in Fig. 9. When the seat A is so extended, it forms the lower berth in the compartment, while the seat B when extended forms the upper berth. When the seat A is so extended, the hinge member 14 may be shifted to a horizontal position and, when so shifted, rests intermediate its hinged edges on a plate 19 which extends upwardly at an angle from the floor 1 underneath the seat portion when in its seating position, as shown in Figs. 4 and 9. When the seat A is so extended, the back portion or member 12 rests upon the hinge member 14, while the seat member of this seat A is supported in a horizontal position in alignment with the back member by the rods 13 and 15 which rest in a supporting track 20 mounted above an inclined plate 21, similar to the plate 19 but at the opposite end of the compartment, and secured to the opposite side walls 3 and 7 of the compartment. This track also facilitates the unfolding of the seat to a horizontal position by permitting the seat member 11 to fold downwardly with the rod 15 in the track 20. As the seat members are shifted to their extended positions, the ends of the rods 15 are supported with respect to the walls of the compartment in fittings 22, shown in Figs. 4, 5 and 9, said fittings forming an extension of the tracks but preventing the extreme ends of the seat members from being raised from the tracks.

As the seat B is converted into a berth, the hinge member 17 is swung to the dotted line position shown in Fig. 4 and the solid line position in Fig. 9 until the flanges at the opposite lateral sides of the hinge member 17 rest in the fittings 23 which are in the form of hooks, shown best in Fig. 6, secured to the opposite side walls 3 and 7. As the seat B is so shifted to the first position, the supporting rod 15 of the seat B is raised above the curved track 24 secured to the wall 3 near the opposite end of the compartment from the normal position of the seat B. On the opposite wall of the compartment, namely on the wall 6, is secured a short track 25, shown best in Fig. 10, which track 25 is shaped similarly to the track 24 and in opposed relation thereto. At the ends of the tracks 24 and 25, and extending toward the end wall 4, are positioned fittings 26 which are the same as the fittings 22 shown in Fig. 5. As the seat B is extended to its full length, the rod 15 bears down upon the tracks 24 and 25 and directs the ends of the rod 15 into the fittings 26 where the rod is held in position.

At the outer sides of the flanges 11c of the seat members 11 of the seat B are provided lugs 11d which, when the seat B is raised to its berth position, is adapted to support the seat and back portions at their hinged connection on the opposite side walls 3 and 6, the lug on the side of the seat member 11 adjacent the wall 3 being supported on a fitting 27, shown best in Fig. 7, while the lug on the side of the member 11 adjacent the wall 6 is supported in a notch 28a in a bracket 28. This bracket 28 is hinged on a vertical axis on the wall 6 and is adapted when not in use to be folded inwardly against said wall, as shown by dotted lines in Fig. 10 and by solid lines in Fig. 1.

It will be here noted that when the seats are converted into berths, the hinge members 14 and 17 also form extensions for the berths extending the back members 12 considerably beyond their normally upper ends and filling the spaces between such back members and the end walls of the compartments on which such hinge members are mounted, as shown in Figs. 4 and 9.

In the drawings the upper portion of the compartment in which the seats are positioned is somewhat longer than the lower portion. The ordinary or convenient size of the seat and back portions of the seat, together with the hinge member 17, will not be sufficient to extend the full length of the upper portion of the compartment, unless strength or other convenience is sacrificed. I have therefore provided an auxiliary plate or extension member 29, as shown in Figs. 4 and 9, which is pivotally mounted at one edge on the end wall 4 and which is adapted, when the seat A is in its seating position, to be held in a vertical position against the end wall 4 by the back portion of the seat A, and which is adapted, when the seats are converted into berths, to be folded downwardly against the bottom portion of the seat member 11, thus forming an upper berth extending the full length between the end walls of the compartment.

The cushions for the seat and back portions of each seat are made unitary and serve not only as the cushions for the seats when used as seats but serve also as mattresses when the seats are converted into berths. These unitary cushions are made of two members, namely, a pneumatic cushion member 31 and a pad 32. The pneumatic cushion member 31, which is shown inflated and in extended positions in Figs. 2 and 3, is a tufted pneumatic cushion made preferably of rubber. This pneumatic cushion is made in a multiplicity of sections 31a, 31b, 31c, 31d and 31e dividing the cushion longitudinally but connected together by narrow and thin portions 31f, 31g, 31h, and 31i, respectively. The several sections of the cushion are adapted to be readily folded with respect to each other at said narrow and thin connecting portions. It will be here noted that the section 31a, 31b and 31c are all connected together by air passages in the connecting portions 31f and 31g, while the sections 31d and 31e are also connected together by air passages in the connecting portion 31i. Thus there is provided a cushion having two separate and disconnected air compartments which may be inflated to different pressures. In this instance, the sections 31a, 31b and 31c are inflated to greater pressure than the other sections of the cushion. The sections 31a and 31b form the seat portion of the cushion, while the remaining sections form the back portions of the cushion. Said remaining sections 31c, 31d and 31e are laid against the back member 12 with the connecting portion 31g of the cushion at the juncture or near the pivotal connection between the seat and back members 11 and 12. The section 31a is folded about the connecting portion 31f over the section 31b providing a double cushion for the seat portion of the seat. Over the outer sides of the pneumatic cushion is placed a soft pad of fabric covered cotton or the like. The normally upper end of the pad 32 is provided with a loop or seam 32a in which is placed a rod 33 which extends beyond the lateral edges of the pad and is held at its ends in spring clips 34 secured to the end walls of the compartment beyond the outer ends of the retaining clip 18 described above, as shown best in Fig. 12. The loop 32a is large enough to permit the necessary vertical movement of the seat back when the rods 15 are shifted in the fittings 16. The portion of the pad at the juncture of the seat and back portions of the seat is secured down against the pneumatic cushion adjacent the connecting portion 31g by another rod 35 which is secured at its ends between the flanges 11c of the seat portions 11, as shown best in Fig. 4, thus forming substantially a separation between the seat and back cushions of the seat. The opposite end of the pad is loosely tucked under the lower side of the folded over portion of the pneumatic cushion, forming a soft, resilient and well rounded seat portion or cushion for the seat. The pad 32 is also secured against the cushion at the connecting portion 31i of the latter by a third rod 36 which is secured at its ends between the flanges of the back portion of the seat. This rod 36 forms substantially a separation intermediate the upper and lower ends of the back forming cushion, forming substantially separate back cushions and head cushions.

It will be noted that the section 31c of the pneumatic cushion, which is provided with greater pressure than the sections 31d and 31e, forms the lower portion of the back cushion where greater resiliency or resistance might be required for the occupant of the seat.

It will be noted that in addition to the clips 18, adapted for holding the back members 12 against the end walls of the compartment, the pad 32, held at the upper end by the rod 33, also holds the back members 12 against such end walls, particularly when the back members should be lowered beyond the limits of the clips 18 when the rod 15 is adjusted forwardly or backwardly in the fittings 15.

When the seats are converted into berths, the rods 33, 35 and 36 are removed, the pneumatic cushion laid flat on the aligned seat and back members and the pad laid on the cushion.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. The combination with a vehicle body having a passenger compartment, of a pair of seats in said compartment, each seat comprising a seat and back portion, the lower ends of the back portions being hinged to the rear portions of the seat portions, means supporting the seat and back portions of one seat whereby said seat and back portions may be shifted into horizontal alinement to form a lower berth in the compartment, and means supporting the seat and back portions of the other seat whereby said seat and back portion may be shifted into horizontal alinement to form an upper berth in said compartment, and means supported from the walls of the compartment for supporting the normally upper ends of the back portions and the normally forward ends of the seat portions when the seats are either in the form of seats or when converted into berths, and also for supporting the same at their hinged portions when the same are converted into berths.

2. In a seat and berth construction for vehicles having passenger compartments, a pair of opposed seats arranged in each compartment, each seat comprising a seat and back portion, the lower ends of the back portion being hinged to the rear portions of the seat portions, means supporting the seat and back portions of one seat whereby said seat and back portion may be shifted into horizontal alinement to form a lower berth in the compartment, and means supporting said seat and back portions of the other seat whereby said seat and back portion may be shifted into horizontal alinement to form an upper berth in said compartment, each of said seats when converted into a berth disposed with an end in spaced relation to the adjacent wall of said compartment, and means in connection with the walls of the compartment for filling the spaces between the end portions of the seats and said adjacent walls.

3. In a seat and berth construction for a vehicle body wherein there is a passenger compartment and a seat therein comprising a seat portion and a back portion when said seat is in its normal position and means whereby said seat is convertible into a berth, the combination therewith of a hinge member pivotally mounted on a wall of said compartment and pivotally connected to the back portion of said seat intermediate its upper and lower ends, said hinge member coacting with a wall of said compartment to support said back portion in a back supporting position when said seat is in its normal position and bracket means coacting with said hinge member to support said back portion in horizontal position when said seat is converted into a berth, the connection of said hinge member with said back portion being disposed so as to arrange the extended end of said back portion in spaced relation with the adjacent wall when said seat is converted into a berth, a portion of said hinge member filling the space between the extended end of said back portion and the adjacent walls of said compartment.

4. In a seat and berth construction for a vehicle body wherein there is a passenger compartment and a seat therein comprising a seat portion and a back portion when said seat is in its normal position and means whereby said seat is convertible into a berth having a length less than the length of said passenger compartment, the combination therewith of a hinge member pivotally mounted on a wall of said compartment and pivotally connected to the back portion of said seat intermediate its upper and lower ends, said hinge member coacting with a wall of said compartment to support said back portion in a back supporting position when said seat is in its normal position and bracket means coacting with said hinge member to support said back portion in horizontal position when said seat is converted into a berth, the connection of said hinge member with said back portion being disposed so as to arrange the extended end of said back portion in spaced relation with the adjacent wall when said seat is converted into a berth, a portion of said hinge member filling the space between the extended end of said back portion and the adjacent walls of said compartment, and shelf means mounted on the opposite end wall of the compartment and extendible toward the seat portion for filling the space between the latter and the latter end wall when the seat is converted into a berth.

5. The combination with a vehicle body having a passenger compartment, of a seat positioned in the compartment and comprising a seat portion and a back portion, the lower end of the latter being pivotally connected to the inner end of the former, a hinge member pivotally connected at one end to an end wall of said compartment and at its opposite or extended end to the back side of the back portion and intermediate the ends thereof, rack means supported from the side walls of said compartment, and means for removably supporting the outer portion of the seat portion in various positions with respect to the rack means for variously supporting the outer portion thereof and for correspondingly inclining the back portion with respect to the seat portion by reason of their pivotal connection with each other, the seat portion being adapted to be raised from the rack means and, when so raised, to be shifted with the back portion to a horizontal plane by reason of their pivotal connection with each other and said hinge member in such a manner as to form a berth, and other means for supporting the back and seat portions when shifted to said horizontal positions, said hinge member supporting the normally upper end of the back portion when the latter is shifted to said horizontal position.

6. The combination with a vehicle body having a passenger compartment, of a seat positioned in the compartment and comprising a seat portion and a back portion, the lower end of the latter being pivotally connected to the inner end of the former, a hinge member pivotally connected at one end to an end wall of said compartment and at its extended or opposite end to the back side of the back portion and intermediate the ends thereof, rack means supported from the side walls of said compartment adjacent the side at which the supporting means is positioned, and means for supporting the seat portion in various positions with respect to the rack means and for correspondingly inclining the back portion with respect to the seat portion by reason of their pivotal connection with each other.

DWIGHT E. AUSTIN.